United States Patent [19]

Chen

[11] Patent Number: 5,738,078

[45] Date of Patent: Apr. 14, 1998

[54] BURNING EFFECT BOOSTER FOR AN ENGINE

[76] Inventor: Kuei-Lan Chen, P.O. Box 90, Tainan City 704, Taiwan

[21] Appl. No.: 866,409

[22] Filed: May 30, 1997

[51] Int. Cl.⁶ ................................................ F02M 23/00
[52] U.S. Cl. .................................................... 123/587
[58] Field of Search ................................. 123/585, 587

[56] References Cited

U.S. PATENT DOCUMENTS

| | | | |
|---|---|---|---|
| 4,934,331 | 6/1990 | Pommer | 123/587 |
| 5,012,789 | 5/1991 | Spicuzza et al. | 123/587 |
| 5,046,475 | 9/1991 | Thompson | 123/587 |
| 5,245,976 | 9/1993 | Faull | 123/587 |
| 5,313,926 | 5/1994 | Lin | 123/587 |

*Primary Examiner*—Erick R. Solis

[57] ABSTRACT

A burning effect booster for an engine includes a body, a filter device, adjusting screws, and vacuum valve units. The vacuum valves units respectively have two nozzles to be connected with the intake manifold of an engine. The adjusting screws are adjusted depending on air intake volume, compression rate and the number of throttles of the engine, controlling filtered clean air to be sucked through the vacuum valves units into the intake manifold by means of the pistons moved in cylindrical threaded members in the vacuum valve units according to vacuity in the intake manifold. Then gas in the engine can burn completely to reduce waste gas exhausted.

5 Claims, 4 Drawing Sheets

BURNING EFFECT BOOSTER FOR AN ENGINE

BACKGROUND OF THE INVENTION

This invention concerns a burning effect booster for an engine, particularly having a filter device, adjusting screws and vacuum valve units for supplying supplementally an engine with filtered clear air so that gas in the engine can burn completely to reduce waste gas, subsequently reducing air pollution for improving air quality and saving energy.

Technology has been developed and new inventions have afforded us conveniences in our daily life, but negative effects have also been arisen with them. For example, automobiles and motorcycles have contributed largely in shortening distance and the time needed in transportation, but on the contrary, they have brought us discomfort such as noises and air pollution. As to noises, they have been controlled by various devices to a tolerable degree. But waste gas combing from automobiles or motorcycles are still not improved much, producing much air pollution in crowded cities as to form harmful cause to our health. Therefore, authorities in most countries around the world have put in effect laws of improving waste gas from automobiles and motorcycles. And catalyst converters have been recommended to be installed in engines for reducing harmful gas in fuel. However, use of the catalyst converters limit gas exhausted out of the engine, impossible to keep normal speed. Then the engine has to be operated at greater speed, resulting in larger consumption of gas.

SUMMARY OF THE INVENTION

This invention has been devised to offer a booster for an engine to supply supplementally with filtered clear air to the engine so as to permit gas burn completely, subsequently reducing waste gas exhausted.

One feature of the invention is a cylindrical filter net made of grain metal compressed and wrought, having innumerable apertures for air to pass through but block dirty matters from passing through.

Another feature of the invention is vacuum valve units to be connected with a front end and a rear end of the intake manifold of an engine, functioning to permit proper filtered clean air volume to be supplied in the engine in due time so that gas in the engine may burn completely so as to reduce waste gas exhausted out of the engine.

One more feature of the invention is adjusting screws to be adjusted depending on the air intake volume, compression rate and the number of throttles of an automobile, permitting filtered clean air pass through the vacuum valve units in proper volume and in due time.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
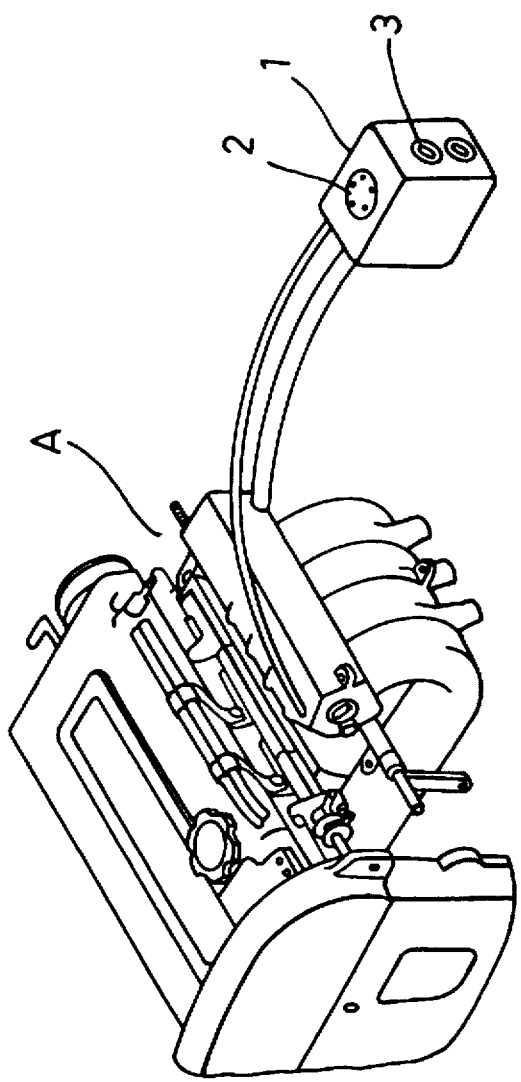
FIG. 1 is a perspective view of a burning effect booster for an engine in the present invention.

A preferred embodiment of a burning effect booster for an engine in the present invention, as shown in FIG. 1, includes a body 1, an air filter device 2, two elongate adjusting screws 3, 3, and two vacuum valve units 4, 4 as main components combined together.

The body 1 is fixed on an engine cylinder A, having a deep vertical passageway 10 in the intermediate portion, a round chamber 11 located just on the passageway and having a larger diameter than that of the passageway 10, female threads 110 formed on an upper portion of the chamber 11, an engage edge 12 provided between the chamber 11 and the passageway 10, two recessed holes 13,13 formed sidewise in a right side and female threads 130 formed to extend inward from the bottom of each recessed hole 13 and reaching and communicating with the vertical passageway 10, two recessed chambers 14, 14 formed sidewise in a left side, a cone-shaped connect hole 140 extending from the bottom of each chamber 14 to reach and communicate with the vertical passageway 10.

The air filter device 2 is disposed in the chamber 11 of the body 1, having a round lid 20, a cylindrical filter net 21 and a gasket 22. The filter net 21 is made of grain metal compressed and wrought, having innumerable apertures so as to filter absolutely dirty matters. The round lid 20 has several small holes spaced apart near the peripheral edge in corresponding location to the outer diameter of the filter net, and male threads 201 engaging female threads 110 of the chamber 11.

The two elongate adjusting screws 3, 3 respectively have a threaded rod 30 provided with male threads, and a spring S1 fits around the threaded rod 30 of each adjusting screw 3. Each adjusting screw 3 together with each spring S1 is inserted in each recessed hole 13. Further, each adjusting screw 3 has a notch 31 in an outer end surface projecting out of each recessed hole 13, and each threaded rod 30 has a pointed portion 300 and engages the female threads 130 of each recessed hole 13. A cap 32 is provided to fix on the outer end of each adjusting screw 3 to keep each adjusting screw 3 in place.

The two vacuum units 4, 4' are respectively disposed in the two recessed chambers 14, 14', respectively having a nozzle 40, 40' provided with a through hole 400, 400' and female threads 401, 401', a piston 41,41' shaped like a bullet, and a spring S2 inserted in the female threaded 401, 401'. Each piston 41, 41' has a pointed head 410, 410', an O-shaped ring P fitted around the lower end of the pointed head 410, 410', and a cylindrical portion extending to the left from the pistoned head 410, 410' and several air holes 411, 411' bored in the cylindrical portion. Further, the spring S2 extends in the cylindrical portion. A cylindrical threaded member 42, 42' is provided, having male threads to engage the female threads 401,401' of the nozzle 40, 40', a hollow interior for each piston 41, 41' to fit therein, and a center hole 420, 420' in a right end for the point of the the head 410, 410' to protrude out.

Figure 2:
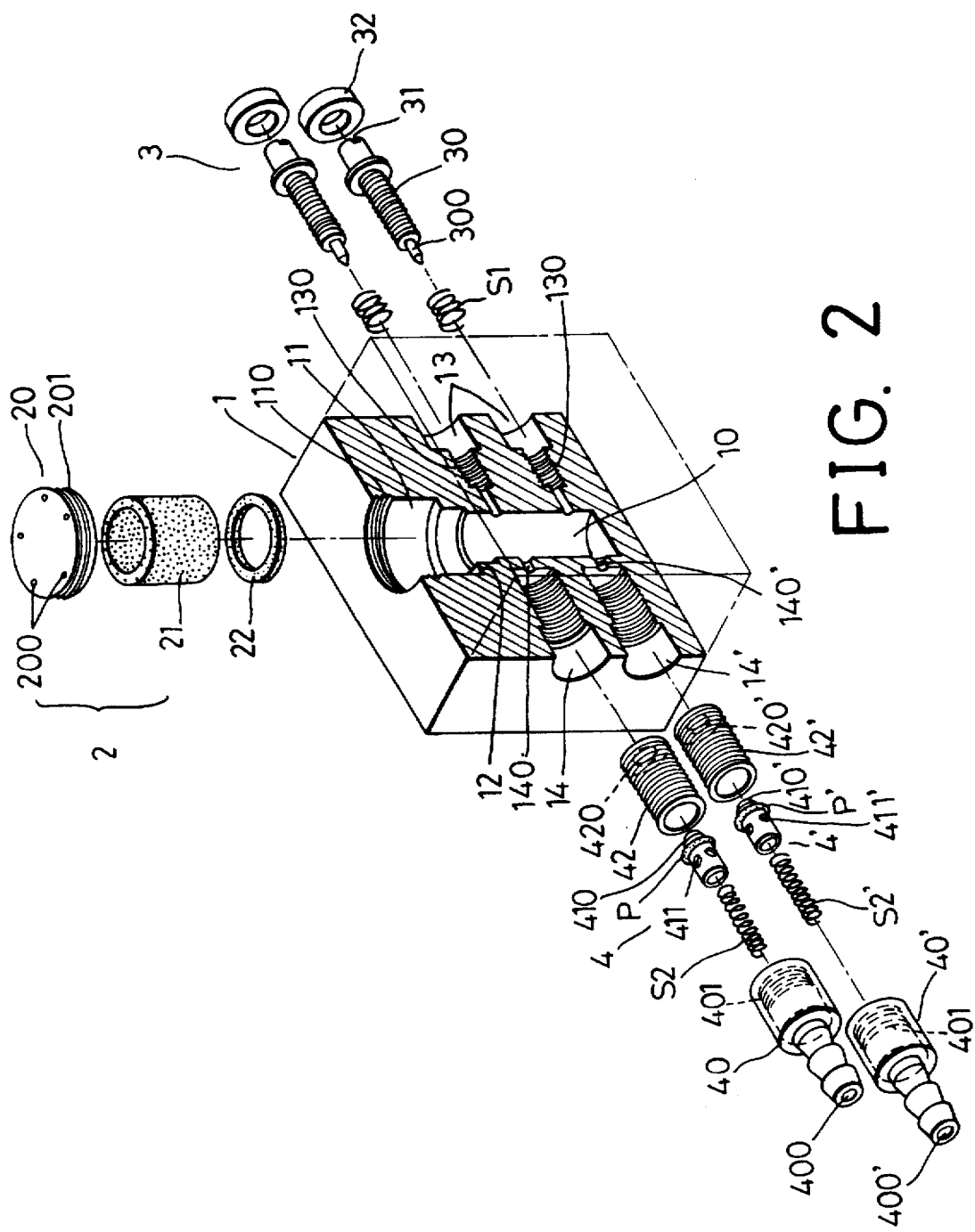
FIG. 2 is an exploded perspective view of the burning effect booster for an engine in the present invention.
Figure 3:
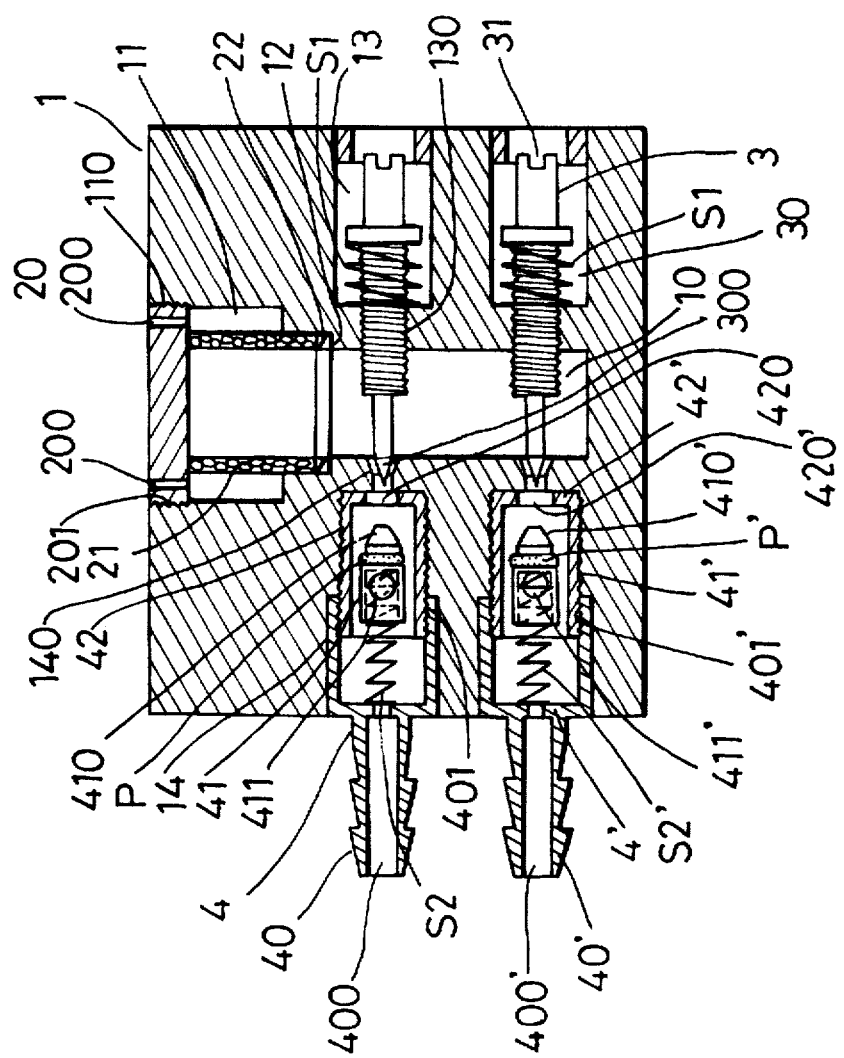
FIG. 3 is a cross-sectional view of the burning effect booster for an engine in the present invention; and, FIG. 4 is a cross-sectional view of the burning effect booster for an engine in the present invention, showing air flowing route.

In assembling, referring to FIGS. 2 and 3, firstly, the gasket 22 is placed around the engage edge 12 of the body 1, and next the filter net 21 is deposited in the chamber 11 of the body 1, with its lower end resting on the gasket 22 and restricted by the engage edge 12. Then the lid 20 is screwed with the chamber 11, with the male threads 201 engaging female threads 110. Next, each spring S1 is placed in each recessed hole 13, and the pointed portion 300 of the threaded rod 30 of each adjusting screw 3 is extended in the recessed hole 13 with the threaded rod 30 rotated to engage the female threads 130 and continued to be rotated until the pointed portion 300 extend in the hole 140 of each recessed chamber 14. Then the notch 31 of each adjusting screw 3 is located outside each recessed hole 13 to let the cap 32 fix with the outer end of the adjusting screw 3 in place. Further, the two springs S2, S2 are respectively inserted in the pistons 41, 41', and each piston with the spring S2 is inserted in the cylindrical threaded member 42, letting the pointed end of each head 410, 410' fitting in the round hole 420, 420'. Then the right end of each piston 41, 41' with the spring S2 and together with the cylindrical threaded member 42, 42' is to face each threaded hole 401, 401', and then each cylindrical threaded member 42, 42' is rotated to let the male threads of the cylindrical threaded member 42, 42' engage the female threads 401, 401' of the nozzle 40, 40', assembling each cylindrical threaded member 42, 42' with each nozzle 40, 40' firmly. Then each piston 41' is urged elastically by each spring S2, extending out of the round hole 420, 420' of each cylindrical threaded member 42, 42', with each head 410, 410' face to each pointed portion 300 of the threaded rod 30 of each adjusting screw 3, 3. Then assemblage of the body 1 is finished.

Figure 4:
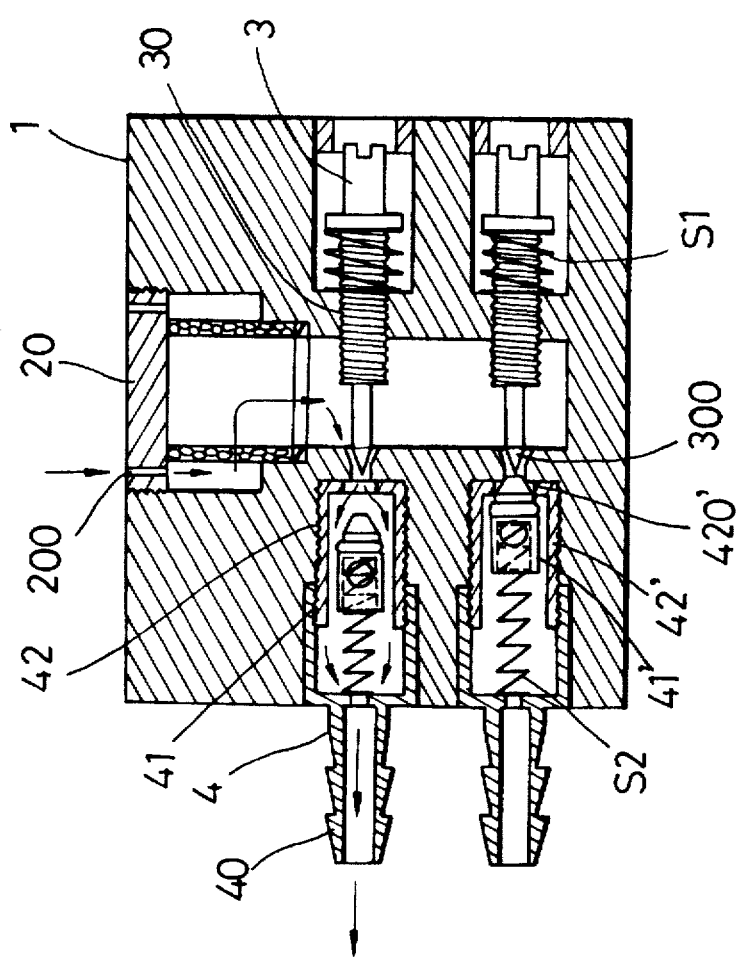

In using, referring to FIGS. 3 and 4, the assembled booster is fixed on a proper location of an engine cylinder A. Each nozzle 40, 40' is respectively connected with a soft tube tightly with a front end and a rear end of the intake manifold of the engine A.

Then the adjusting screw is adjusted with a driver fitted in the slot 31, depending on air intake volume, compression rate, and the number of throttles for controlling filtered clean air to pass through the passageway 10. The pistons 41, 41' slide back and forth in the cylindrical threaded members 42, 42' in proportion to the sucking force caused by various vacuum condition so that filtered clean air may be allowed to pass through the vacuum valve units 4, 4 into the intake manifold of the engine in proper volume and in due time.

When the engine is in a heavy load or accelerating to a high speed and the throttle is opened largely, the pistons 41, 41' of the vacuum valve units 4, 4' do not receive any sucking force, with the vacuity in the intake manifold being less than 3 in. HG. Then no filtered clean air enters the intake manifold.

Further, when the engine is accelerated and the throttle is opened in a medium degree, with the vacuity in the intake manifold being larger than 3 in. HG but less than 6 in. HG, a sucking force will be produced against only the piston 41 of the vacuum valve unit 4 connected with the front end of the intake manifold, but against the other piston 41' of the other vacuum valve 4' connected with the front end of the intake manifold. Then filtered clean air is only guided in through the front end of the intake manifold by the piston 41 sucked open.

In case the engine is operating idle or in a certain definite speed and the vacuity in the intake manifold is larger than 6 in. HG, the two pistons 41, 41' of both the two vacuum units 4, 4' are sucked open by the sucking force, filtered clean air is to be sucked through the small holes 200 of the lid 20 of the filter device 2 into the vertical chamber 11 of the body 1 and then filtered by the filter net 21 to become filtered clean air. Then this filtered clean air is further guided through the two nozzles 40, 40' and then into the engine through the intake manifold, supplementing air in the engine cylinders and thus promoting burning effect of gas in the cylinders.

As can be understood from the above description, the booster in the present invention has advantages as follows:

1. Alteration of vacuity in the intake manifold caused by an engine produces a sucking force able to control operation of the pistons of the vacuum valve units so that a proper needed volume of filtered clean air may be supplied to the engine in due time, supplementing air for gas to burn completely.
2. Complete burning of gas in the engine can increase horsepower for 20%–30%, reducing waste gas HC/CO for 50% or so. Further, subsequently air pollution can also be reduced, and consequently energy can also be saved.
3. Economic gain and quality of living are also bettered by improvement of the air quality and saving of energy.
4. It has a concise structure, easy to assemble, occupying only a small space, adaptable to all sorts of vehicles.
5. The lid of the filter device can prevent dirty matters from entering or clogging the chamber of the body, and the small holes of the lid surely permit air to flow in, and in addition, the special filter net can certainly block dirty matters from passing through in the intake manifold.

While the preferred embodiment of the invention has been described above, it will be recognized and understood that various modifications may be made therein and the appended claims are intended to cover all such modifications which may fall within the spirit and scope of the invention.

What is claimed is:

1. A burning effect booster for an engine comprising:

a body having a vertical passageway and a vertical chamber located on said passageway, two sidewise recessed holes provided in one vertical side, two sidewise recessed chambers provided in the other vertical side and located in line with said recessed holes, a threaded hole extending inward from a bottom of each said sidewise recessed hole and communicating with said passageway, a connect hole extending inward from a bottom of each said recessed chamber and communicating with said passageway;

a filter device located in said chamber of said body;

two elongate adjusting screws respectively having a male threaded rod, respectively disposed in each said recessed holes, having a pointed portion extending in inward from said male threaded rod;

two vacuum units respectively disposed in each said recessed chambers of said body, respectively consisting of a nozzle, a spring, a piston and a cylindrical threaded member, each said piston having a right pointed end facing said pointed portion of each said adjusting screw, each said piston further having a front hollow cylindrical portion for said spring to extend therein, said front hollow cylindrical portion having several air holes;

said booster being fixed on a proper location on a cylinder of an engine of an automobile after being assembled together, said two nozzles respectively connected with a soft tube tightly with a front end and a rear end of an intake manifold of said engine, said adjusting screws properly adjusted for controlling filtered clean air to pass through said passageway depending on air intake volume, compression rate and the number of throttles of said engine, said pistons receiving sucking force in accordance with vacuity in said intake manifold produced by said engine, said pistons then sliding back and forth in said cylindrical threaded members so as to permit proper filtered clean air flow through said nozzles in said intake manifold of said engine in due time as to supplement air needed so that gas in the engine may burn completely, subsequently boosting horsepower of said engine, and exhausted waste gas may be reduced, with air pollution being reduced accordingly to obtain effect in saving energy.

2. The burning effect booster for an engine as claimed in claim 1, wherein said vertical chamber is provided with female threads and an engage edge is provided between said vertical chamber and said passageway.

3. The burning effect booster for an engine as claimed in claim 1, wherein said filter device consists of a round upper lid, a cylindrical filter net and a gasket, said cylindrical filter net is made of grain metal compressed and wrought, having innumerable apertures for air to pass through but block dirty matters from passing through, and said upper lid has several small holes spaced around near a peripheral edge in corresponding locations to an outer diameter of said filter net and male threads engaging said female threads of said vertical chamber of said body.

4. The burning effect booster for an engine as claimed in claim 1, wherein said adjusting screws respectively has a slot in an outer end surface, said threaded rods respectively engage said threaded hole of said recessed holes, and a cap is provided to fix the outer end of each said adjusting screw to keep the same in place.

5. The burning effect booster for an engine as claimed in claim 1, wherein each said nozzle has a center through hole, female threads in an inner cylindrical Wall of a rear end, and each said spring, each said piston and each said cylindrical threaded member are orderly disposed in said inner cylindrical wall, with said cylindrical threaded member having a round hole in a right end surface for said pointed end of said piston to protrude out.

* * * * *